United States Patent [19]

Kollmar

[11] Patent Number: 4,643,088
[45] Date of Patent: Feb. 17, 1987

[54] METHOD AND DEVICE FOR EXTRACTING JUICE FROM FRUIT

[76] Inventor: Ulrich Kollmar, Auf dem Berg 17, 7530 Pforzheim-Würm, Fed. Rep. of Germany

[21] Appl. No.: 687,857

[22] Filed: Dec. 31, 1984

[30] Foreign Application Priority Data

Dec. 29, 1983 [DE] Fed. Rep. of Germany ....... 3347447

[51] Int. Cl.$^4$ .................. B30B 9/24; B30B 13/00
[52] U.S. Cl. .................. 100/37; 100/72; 100/74; 100/75; 100/118; 100/193; 99/495
[58] Field of Search ............... 100/37, 71, 72, 73, 100/74, 75, 193, 118, 119, 120, 151-154, 137, 138, 139; 99/495, 510; 210/386, 400, 401

[56] References Cited

U.S. PATENT DOCUMENTS

| | | | |
|---|---|---|---|
| 1,353,349 | 9/1920 | Krafft | 100/75 X |
| 3,552,304 | 1/1971 | French | 100/75 X |
| 4,181,616 | 1/1980 | Bahr | 100/118 X |
| 4,253,390 | 3/1981 | Hunt et al. | 100/117 X |
| 4,323,007 | 4/1982 | Hunt et al. | 100/117 |
| 4,392,422 | 7/1983 | Hakansson | 100/118 |

FOREIGN PATENT DOCUMENTS 855942 11/1952 Fed. Rep. of Germany.
2252979 4/1974 Fed. Rep. of Germany.

Primary Examiner—Peter Feldman
Attorney, Agent, or Firm—Joseph A. Geiger

[57] ABSTRACT

A dual-cycle method of extracting juice from fruit and a juice extraction installation consisting of two angular presses in tandem arrangement in which the fruit mash yields first quality juice and pomace in the first press, and this pomace is immediately broken up and deposited on the horizontal run of the second press, under the addition of water which soaks and swells the pomace, before it passes through the second extraction press. The latter yields juice of second quality and twice-pressed pomace.

9 Claims, 1 Drawing Figure

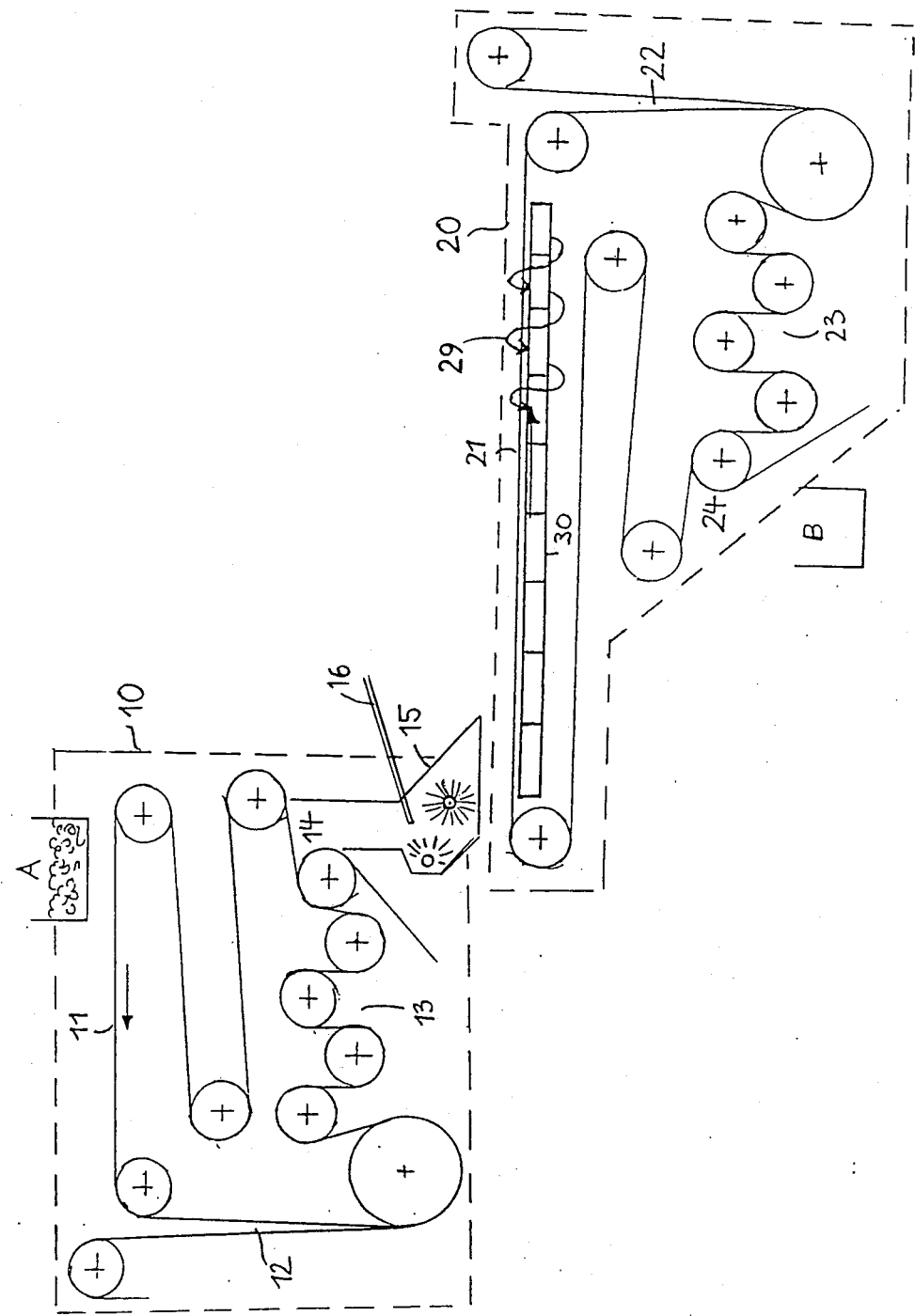

METHOD AND DEVICE FOR EXTRACTING JUICE FROM FRUIT

BACKGROUND OF THE INVENTION

1. Field of the Invention

The present invention relates to methods of extracting juice from fruit and to juice extraction presses and, more particularly, to a dual-cycle fruit juice extraction method and a pressing installation for the performance of such a method.

2. Description of the Prior Art

It is known in the art of fruit juice extraction to process fruit in two separate extraction cycles, whereby pure, natural fruit juice of first quality is obtained in a first extraction cycle involving a fruit mash pressing operation, and a juice of second quality is obtained in a second extraction cycle involving the addition of water to the concentrate or pomace which is left over at the end of the first pressing operation.

This kind of dual-cycle juice extraction method is widely used in the soft drink industry, because it is well suited to conformance with the regulatory requirements, according to which the pure fruit juice obtained in the first extraction cycle, if free of any additives, may be labeled and sold as "fruit juice", whereas the product obtained in the second extraction cycle is a soft drink base, or juice of second quality, which can be further processed to obtain either "nectar" or fruit-flavored soft drinks, the composition of which is likewise regulated.

In a known fruit juice extraction process, the soft drink base is obtained by using an elongated web filter, a so-called "extractor", onto which the pomace is deposited and repeatedly rinsed with water in a recirculating process, whereby the water receives a progressively higher concentration of the base substances with each rinsing cycle.

Juice fruit, such as apples, for example, contain 90–95% soluble substance, approximately 70% of which is removable from the apple mash in the first pressing cycle.

It has been found, however, that the second extraction cycle using a web filter, or extractor, has certain shortcomings and problems connected therewith:

The finally remaining pomace which cannot be processed any further has a high content of water and it may be necessary, under certain circumstances to subject it to a further pressing operation. The rinsing of the pomace and the subsequent pressing operation transfers a relatively large portion of turbidity causing substances to the juice, where they represent a detracting factor, whereas, if they remain in the pomace, they may actually be beneficial in the course of further processing of the latter.

Another shortcoming of the known second processing cycle for the extraction of second-quality juice from once-pressed pomace relates to the fact that this cycle involves a very costly and energy-intensive operation.

SUMMARY OF THE INVENTION

Underlying the present invention is the objective of improving upon the known juice extraction method by devising a second juice extraction cycle which is more gentle in its operation and more economical in its energy consumption, at the same level of output.

The present invention proposes to attain this objective by suggesting a juice extraction method and a juice extraction installation in which the pomace discharged from a first continuously operating extraction press is mixed with a metered quantity of water and immediately deposited in a reaction station, where it remains for a predetermined period of time, before being fed directly to a second extraction press.

Accordingly, the inventive process involves the immediate reprocessing of the pomace obtained from the first extraction press in a second cycle in which it is admixed with water only once, so as to allow the pomace to soak and swell for a short period of time, during which the remaining soluble dry substance is dissolved—this short soaking period determines the duration of dwell in the reaction station—whereupon it is extracted in a second pressing operation.

The novel juice extraction method offers a considerable simplification of the overall process in the form of an integrated dual-cycle juice extraction process which readily lends itself to full automation. At the end of the second pressing operation is obtained a pomace which has its dry substance substantially removed, so that no further liquid extraction in a separate installation is necessary. The turbidity producing substances contained in the once-pressed pomace are largely retained therein, and only a small portion of these substances is transferred to the juice in the second pressing operation.

As a whole, the novel juice extraction method involves fewer method steps in the second juice extraction cycle and it offers a more gentle handling of the fruit pulp. The soft drink base obtained in the second pressing cycle can be used immediately for the bottling of second quality fruit juice or of fruit-juice-containing soft drinks.

A particularly advantageous installation for the performance of the method of the invention consists of two basically identical extraction presses which are so arranged that the discharge opening of the first press is arranged above the second press. Preferably, both presses are of a known angular type, for example, the type which is described in the German Auslegeschrift (Publ. Application) No. 22 52 979.

Such an installation requires no separate means of conveyance and/or storage for the once-pressed pomace, a fact which is part of the reason, why the pomace is subjected to a minimum of damage. Another reason for the minimization of damage to the pomace relates to the fact that the once-pressed pomace is immediately reprocessed in a breakup and soaking operation, which precludes any oxidation of the pomace between the first and second juice extraction cycles.

In a preferred embodiment of the invention, the discharge opening of the first juice extraction press leads directly into a device which breaks up the pomace, while a predetermined quantity of water is added. This re-mashed pomace is deposited directly onto the horizontal runoff portion of the second juice extraction press. As the pomace mash travels toward the vertical press run of the second extraction press, a reaction takes place between the water and the broken-up pomace by which the remaining soluble juice substances are leached out of the latter.

In an alternate version of the method of the invention, the horizontal runoff portion of the second juice extraction press may serve as an extractor, where the broken-up pomace and the water are combined in a cascade-type counter-flow process. The spatial arrangement between the two filter presses thereby remains substantially unchanged.

In this version, the water is not added at the point of pomace breakup, but at a point near the junction of the horizontal runoff portion of the press run with the vertical press run. Below this runoff structure is arranged a succession of separate collecting troughs from which the fluid is pumped back onto the re-mashed pomace in such a way that the contents of each collecting trough are pumped to a location above the adjacent collecting trough in the upstream direction of the press run. The richest juice runoff, which collects in the first trough on the upstream side of the run, is drawn off as extraction product of the second juice extraction cycle.

BRIEF DESCRIPTION OF THE DRAWING

Further special features and advantages of the invention will become apparent from the description following below, when taken together with the accompanying drawing which illustrates, by way of example, a preferred embodiment of the invention represented as follows:

The sole FIGURE of the drawing shows, in a somewhat schematical elevational representation, an installation for the extraction of juice in accordance with the method of the present invention, featuring two extraction presses in a tandem arrangement.

DESCRIPTION OF THE PREFERRED EMBODIMENT

The juice extraction device of the invention consists of two structurally substantially identical filter presses 10 and 20 of the angular-press type which is disclosed, for example, in the German Auslegeschrift (Publ. Application) No. 22 52 979, the disclosure of which is to be considered incorporated herein.

For a clearer understanding of the method of the invention, which is to be performed in the operation of this device, the drawing is schematical in nature, showing only the spatial layout and path of the endless filter webs, but not showing the structural details and auxiliary operating units which are part of said known angular filter press.

This known angular filter press 10 or 20 comprises a horizontal runoff portion 11 or 21, respectively, where the mash distribution and pre-pressing runoff takes place, the horizontal runoff portions leading into a vertical press run 12 or 22, respectively, where the mash—fresh mash in the case of the filter press 10 and soaked broken-up pomace in the case of the filter press 20—is enclosed between two filter webs which descend between gradually converging guides to produce a primary pressing action of the mash.

A secondary final pressing action is produced in a horizontal press run 13 or 23, respectively, in which the two filter webs are advanced along an S-shaped path between pairs of vertically staggered pressing rollers. The pressed filter cake or pomace is discharged through the discharge opening 14 or 24, respectively, where the two endless filter webs separate.

The mash which is to be processed, for instance, apple mash from which apple juice is to be extracted, is discharged from a mash loading funnel A onto the horizontal runoff portion 11 of the first filter press 10. After passing through the vertical press run 12 and the horizontal press run 13, the remaining solids emerge as a filter cake of firmly compacted pomace of several centimeters thickness, containing only approximately 30% of the initially delivered apple mash.

From the pomace discharge station 14, the pomace passes into a pomace breakup device 15 which contains one or more rotating breakup drums with peripheral spikes or knives. A metered quantity of water is supplied through a water pipe 16 and sprayed into the breakup device 15 and admixed to the pomace while the latter is being broken up into its constituent particles. A practical mixing ratio would be approximately eight parts by weight of water to five parts by weight of apple pomace.

The broken-up, water-soaked pomace is now discharged directly onto the horizontal runoff portion 21 of the second filter press 20, where it is distributed in a layer of substantially uniform thickness. The length of the horizontal runoff portion 21 is such that the re-mashed pomace advancing on it has sufficient time, from its initial deposit to its entry into the vertical press run 22, to undergo the desired swelling and water absorption process.

The water-swelled re-mashed pomace then passes through the vertical and horizontal runs 22 and 23 of the second filter press 20, at the discharge opening 24 of which the twice-pressed pomace is collected in a container B, or, alternatively, removed on a conveyor belt or the like for further processing.

This novel juice extraction method, in combination with the proposed tandem press installation, offers the possibility of achieving a continuous, fully automated juice extraction operation which requires only appropriate adjustments in the speed of advance of the filter webs, in the metering of the water input to the pomace breakup device 15, and in the length of the horizontal runoff portion 21 of the second press 20 (through relocation of the point of mash deposit, for example), in consideration of the kind and quality of the fruit from which juice is to be extracted. Optimal adjustment values are determined without difficulty in the course of an initial pressing phase.

The products of this fully automated process are pure fruit juice of first quality, fruit juice base of second quality, and water-free pomace. No further processing is necessary. The two juice products are obtained simultaneously and can be bottled immediately.

The once-pressed pomace is subjected to an absolute minimum of structural or chemical damage (through oxidation, for example). In an apple juice extraction operation, for example, the total time elapsed between the delivery of the apple mash onto the first filter press 10 and the discharge of the twice-pressed pomace from the the second filter press 20 is less than twenty minutes.

The use for the proposed novel juice extraction method of two known filter presses in a tandem arrangement results in a comparatively compact installation of low investment cost, minimal servicing requirements, and generally low operating costs. Chief among the cost savings, in comparison with the earlier-described prior art juice extraction processes, are considerable savings in the cost of energy consumed, the reduction being at least approximately 50%, based on the same rate of output.

Since the two filter presses are not special-purpose presses, the proposed installation offers the additional advantage that either one of the two filter presses can also be used separately, for any of the various conventional pressing operations for which they were initially designed.

EXAMPLE OF THE METHOD

In a dual-cycle juice extracting operation in accordance with the present invention, 18 tons of crushed apples are fed to the extraction press 10. The first pressing cycle yields 12.6 tons of pure apple juice of first quality.

To 5.4 tons of pomace discharged from the press 10 and broken up in the breakup device 15 between the two presses 10 and 20, are added 1.8 tons of water. The mash of broken-up pomace and water advances on the horizontal runoff portion of the press 20 for about 3-5 minutes, before reaching its vertical press run 22. During this time, the water swells the pomace particles, leaching out their soluble juice substances.

The second press extracts from the water-swollen pomace mash 1.8 tons of soft drink base (fruit juice of second quality), discharging again 5.4 tons of pomace.

In the place of the described tandem or series-type arrangement of the two extraction presses, where the water is added at the point where the broken-up pomace is deposited onto the horizontal runoff portion 21 of the second press, it is also possible to perform the second extraction cycle in a counter-flow method, by using a procedure which is similar to that used in known extractors. This means that fresh water is added to the broken-up pomace at the end of the horizontal runoff portion 21. The fluid extracted after passage through the press is collected in a trough 30 and pumped back to a point on the horizontal runoff portion 21 which is located closer to the point of mash deposition than the point of water addition, as indicated by the stippled arrows 29 in the drawing.

The re-circulated watery juice flows through the mash layer, while absorbing more of the soluble juice substance from the mash, whereupon it is collected in another trough 30 below the horizontal runoff portion 21 and again added to the pomace mash, at a point which is closer still to said mash deposition point, and so forth. The freshly broken up pomace receives the most concentrated extract which, upon flowing through the horizontal runoff portion of the press, is removed from the extractor.

The choice of whether the series-flow method or the counter-flow approach should be used for the second extraction cycle depends on the type of fruit which is to be processed. The main criterion for this choice is the efficiency of extraction which, for certain types of fruit, may reach 90% or more of the weight of fruit mash which is delivered to the first press.

It should be understood, of course, that the foregoing disclosure describes only a preferred embodiment of the invention and that it is intended to cover all changes and modifications of this example of the invention which fall within the scope of the appended claims.

I claim the following:

1. A method of successively extracting from fruit mash pure fruit juice and fruit juice of inferior quality, the method comprising the steps of;
   feeding a substantially continuous stream of fruit mash to a first juice extraction press of the type which has cooperating endless webs;
   pressing the mash between the webs of the first juice extraction press to extract pure fruit juice, while reducing the fruit mash to a once-pressed pomace;
   breaking up the once-pressed pomace, as it is being discharged from the first juice extraction press;
   directly feeding the once-pressed, broken-up pomace to a second juice extraction press of the type which has cooperating endless webs;
   adding water to the once-pressed pomace and allowing the water to soak and swell the pomace to a pomace mash, as the pomace advances in the second juice extraction press; and
   pressing the pomace mash between the webs of the second juice extraction press to extract juice of inferior quality, while reducing the pomace mash to a twice-pressed pomace.

2. A fruit juice extraction method as defined in claim 1, wherein
   the step of breaking up the once-pressed pomace takes place in the first juice extraction press, just prior to the discharge of said pomace from said press; and
   the step of adding water to the once-pressed pomace takes places substantially simultaneously with the step of breaking up said pomace.

3. A fruit juice extraction method as defined in claim 1 or in claim 2, wherein
   the step of feeding the once-pressed, broken-up pomace to a second fruit extraction press involves the steps of
   depositing said pomace on a substantially horizontal, juice-draining extractor run of said press which forms a succession of extractor sections along said run; and
   reintroducing juice drained from the extractor run into the advancing pomace, whereby juice drained from said pomace in each of a succession of extractor sections is returned to said pomace in the extractor section which is located next-upstream to the extractor section in which the juice was drained from the pomace.

4. A device for the separate extraction from fruit mash of pure fruit juice and fruit juice of inferior quality, the device comprising in combination:
   a first juice extraction press adapted for receiving said fruit mash and for compressing the fruit mash so as to extract therefrom pure fruit juice, while reducing the fruit mash to once-pressed pomace which is discharged on the downstream side of the press;
   a pomace breakup device arranged on the downstream side of the first juice extraction press, the pomace breakup device including moving mechanical means for diminishing the once-pressed pomace into a loose aggregate;
   means for adding water to the once-pressed, broken-up pomace, so as to convert said pomace into a pomace mash; and
   a second juice extraction press adapted for receiving said pomace mash and for compressing the pomace mash so as to extract therefrom fruit juice of inferior quality, while reducing the pomace mash to twice-pressed pomace which is discharged on the downstream side of the second press; and wherein
   the second juice extraction press is arranged in tandem with the first juice extraction press, the once-pressed pomace discharged from the first press being directly transferred to the second press.

5. A fruit juice extraction device as defined in claim 4, wherein
   the first juice extraction press is of the type having two endless webs supported and driven by a plurality of rolls, a substantially horizontally oriented charging and draining run onto which the fruit mash is deposited, and an adjoining, substantially vertically oriented pressing run along which the two webs are guided in a downwardly converging relationship, so as to apply pressure to the fruit mash held between the two webs;

the second juice extraction press is the substantially the same type as said first press, having a substantially horizontally oriented charging and draining run onto which said pomace mash is deposited, and an adjoining, substantially vertically oriented pressing run along which the two webs are guided in a downwardly converging relationship, so as to apply pressure to the pomace mash held between the two webs; and an extremity of the charging and draining run of said second press is arranged below the discharge side of said first press, so as to permit the direct gravity discharge and transfer of the once-pressed pomace from said first press to said second press.

6. A fruit juice extraction device as defined in claim 4 or in claim 5, wherein the pomace breakup device on the downstream side of the first juice extraction press forms a part of said press.

7. A fruit juice extraction device as defined in claim 6, wherein the pomace breakup device includes a housing enclosing said moving mechanical means; and said means for adding water is associated with the pomace breakup device in such a way that water can be sprayed into said housing and onto the once-pressed pomace during the breakup operation.

8. A fruit juice extraction device as defined in claim 6, wherein the second juice extraction press includes a reaction station in which the added water is allowed to react with the once-pressed pomace for a predetermined length of time; and in the case of the second juice extraction press which has a horizontally oriented charging and draining run, the horizontal length of said run is such that it can serve as said reaction station.

9. A fruit juice extraction device as defined in claim 5, wherein the charging and draining run of the second juice extracting press is in the form of an extractor run, defining a succession of extractor sections along said run and including a separate collecting trough underneath each extractor section; and the device further includes means for pumping drained juice from said collecting troughs onto the pomace on said charging and draining run in such a way that juice from each of a succession of collecting troughs is returned to the pomace in the extractor section located next-upstream to the extractor section above the collecting trough from which the juice is pumped.

* * * * *